(12) United States Patent
Nguyen et al.

(10) Patent No.: US 11,366,481 B2
(45) Date of Patent: Jun. 21, 2022

(54) MOBILE BODY AND METHOD OF CONTROLLING MOBILE BODY

(71) Applicant: PANASONIC CORPORATION, Osaka (JP)

(72) Inventors: Duyhinh Nguyen, Chiba (JP); Hiroyuki Uematsu, Tokyo (JP); Takeshi Ando, Tokyo (JP)

(73) Assignee: PANASONIC HOLDINGS CORPORATION, Osaka (JP)

(*) Notice: Subject to any disclaimer, the term of this patent is extended or adjusted under 35 U.S.C. 154(b) by 752 days.

(21) Appl. No.: 16/320,147

(22) PCT Filed: Jul. 18, 2018

(86) PCT No.: PCT/JP2018/026836
§ 371 (c)(1),
(2) Date: Jan. 24, 2019

(87) PCT Pub. No.: WO2019/031168
PCT Pub. Date: Feb. 14, 2019

(65) Prior Publication Data
US 2022/0011780 A1 Jan. 13, 2022

(30) Foreign Application Priority Data
Aug. 7, 2017 (JP) .............................. JP2017-152523

(51) Int. Cl.
*G05D 1/02* (2020.01)
(52) U.S. Cl.
CPC ........... *G05D 1/0274* (2013.01); *G05D 1/024* (2013.01); *G05D 1/0293* (2013.01)

(58) Field of Classification Search
CPC ..... G05D 1/0274; G05D 1/024; G05D 1/0293
See application file for complete search history.

(56) References Cited

U.S. PATENT DOCUMENTS

| 5,835,880 A * | 11/1998 | Gan | G06K 9/00791 701/466 |
| 2008/0134955 A1 * | 6/2008 | Morrow | G09F 21/04 116/28 R |
| 2010/0256852 A1 * | 10/2010 | Mudalige | G08G 1/22 701/24 |

(Continued)

FOREIGN PATENT DOCUMENTS

JP 2011-169055 A 9/2011

*Primary Examiner* — Hunter B Lonsberry
*Assistant Examiner* — Harrison Heflin
(74) *Attorney, Agent, or Firm* — Pearne & Gordon LLP

(57) ABSTRACT

A mobile body configured so that multiple mobile robots can travel along the same track in formation even when an obstacle is present on the travel path of the mobile robots, and a method of controlling the mobile body. This mobile body (100) includes: a map storage (6) that stores travel path information; and an intelligence processor (10) that recognizes whether or not an object in the periphery is a mobile body to be followed (101). When the object is the mobile body to be followed (101) and the mobile body to be followed (101) does not exist on a travel path (16) indicated by the travel path information, the intelligence processor (10) sets a position on the travel path (16) in which the mobile body to be followed (101) is projected, as a temporary destination (17).

8 Claims, 20 Drawing Sheets

(56) References Cited

U.S. PATENT DOCUMENTS

| | | | |
|---|---|---|---|
| 2013/0030606 A1* | 1/2013 | Mudalige | G05D 1/0293 |
| | | | 701/2 |
| 2015/0329049 A1* | 11/2015 | Kanou | B60R 1/00 |
| | | | 348/148 |
| 2017/0168503 A1* | 6/2017 | Amla | G05D 1/0011 |
| 2018/0158334 A1* | 6/2018 | Perez Barrera | G08G 1/166 |
| 2018/0210445 A1* | 7/2018 | Choi | G05D 1/0274 |
| 2021/0139051 A1* | 5/2021 | Cirillo | G08G 1/22 |

* cited by examiner

MOBILE BODY AND METHOD OF CONTROLLING MOBILE BODY

TECHNICAL FIELD

The present invention relates to a mobile body and a method of controlling the mobile body. To be specific, the present invention relates to a mobile body configured so that, when multiple movable bodies travel along the same track, they travel in formation, and also to a method of controlling these movable bodies.

BACKGROUND ART

As conventional technology for formation traveling of mobile robots, mobile robot technology is generally known in which a target (a person, a mobile robot and/or the like) to be followed is detected using a range sensor provided at the front of the mobile robot and the mobile robot travels while following the target.

However, with this technology, when a target other than a target to be followed exists around the mobile robot, it is difficult for the mobile robot to distinguish the target to be followed from the other target.

For example, when multiple persons exist around the mobile robot to be followed, a person is erroneously recognized as the mobile robot to be followed. In some cases, the mobile robot to be followed is lost somewhere in the middle and a person is recognized as a target to be followed.

As technology for solving such a problem, a control method is known in which a travel path is prestored in each mobile body, and the movable bodies move autonomously at the same speed so that the movable bodies travel along the same track in formation (see, for example, PTL 1).

To achieve such formation traveling along the same track, the movable bodies in the formation need to move autonomously on a predesignated track while precisely recognizing its current position.

As technology for self-location recognition in autonomous mobile robots, a method is known in which the position of a landmark on a prestored map is checked against the position of the landmark obtained from the range sensor.

FIG. 16 is a diagram showing an image of multiple movable bodies traveling along the same track in formation according to PTL 1. Mobile robot 20 to be followed and following mobile robot 50 each have range sensor 40.

These mobile robots 20 and 50 store an environmental map and travel in a recognized environment. Mobile robot 20 to be followed autonomously moves along a predesignated path at a designated speed while recognizing its self-position using range sensor 40. Following mobile robot 50 also autonomously moves along the predesignated path at the designated speed while recognizing its self-position using range sensor 40.

At this time, mobile robots 20 and 50 travel at the same speed; therefore, if following mobile robot 50 starts operation with a certain distance therebetween, these mobile robots 20 and 50 can travel along the same track in formation while keeping a certain distance therebetween.

CITATION LIST

Patent Literature

PTL 1
Japanese Patent Application Laid-Open No. 2011-169055

SUMMARY OF INVENTION

Technical Problem

However, with conventional technology, when mobile robot 20 to be followed goes around an obstacle existing on the travel path or decelerates, the problem arises that mobile robot 20 to be followed gets passed by following mobile robot 50 and the formation is broken.

An object of the present invention, which has been made to solve such a problem, is to provide a mobile body configured so that multiple mobile robots can travel along the same track in formation even when an obstacle exists on the travel path of the mobile robots, and a method of controlling the mobile body.

Solution to Problem

In order to achieve the object mentioned above, a mobile body according to the present invention includes: a map storage that stores travel path information; and an intelligence processor that recognizes whether or not an object in a periphery is a mobile body to be followed, in which, when the object is the mobile body to be followed and the mobile body to be followed does not exist on a travel path indicated by the travel path information, the intelligence processor sets a position on the travel path in which the mobile body to be followed is projected, as a temporary destination.

In order to achieve the object mentioned above, a method of controlling a mobile body, according to the present invention includes: recognizing whether or not an object in a periphery is a mobile body to be followed; and setting, when the object is the mobile body to be followed and the mobile body to be followed does not exist on a travel path indicated by travel path information, a position on the travel path in which the mobile body to be followed is projected, as a temporary destination.

Advantageous Effects of Invention

According to the present invention, in the case where multiple mobile robots are operated to travel along the same track in formation using autonomous mobile technology, formation traveling can be continued without breaking the formation even in the event that a mobile robot to be followed decelerates due to some influence.

DESCRIPTION OF EMBODIMENTS

Figure 1:
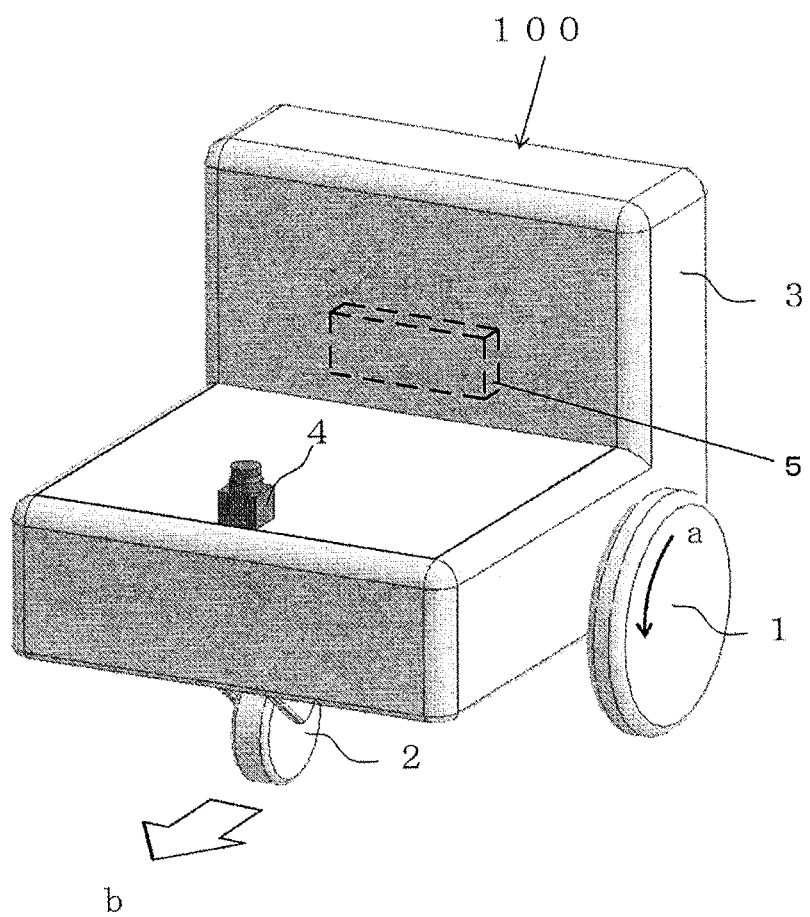
FIG. 1 is a perspective view showing one example of a mobile robot.

Embodiment 1 of the present invention will now be described with reference to the accompanying drawings. It should be noted that the same components are denoted by the same reference numerals. Further, the components in the drawings are schematically shown for convenience of understanding.

The configuration of a mobile robot according to Embodiment 1 of the present invention will now be described. FIG. 1 is a perspective view showing one example of mobile robot 100. Mobile robot 100 includes mobile robot main body 3, a pair of driving wheels 1 provided at the lower rear of mobile robot main body 3, one sub wheel 2 provided at the lower front of mobile robot main body 3, range sensor 4 provided at the upper front of mobile robot main body 3, and controller 5 provided in mobile robot main body 3.

In addition, a recognition marker unique to each mobile robot 100 is attached on the back side of mobile robot main body 3. The recognition marker is recognized by range sensor 4 of another mobile robot 100 following that mobile robot 100. The recognition marker is provided on the same level as range sensor 4.

Driving wheels 1 in a pair are members for supporting mobile robot main body 3 together with sub wheel 2. As shown in FIG. 1, driving wheels 1 in a pair rotate in the direction of arrow a, thereby causing mobile robot 100 to travel in the direction of arrow b (the travel direction). In addition, driving wheels 1 in a pair can separately rotate in the direction of arrow a and the direction opposite to that of arrow a. As driving wheels 1 in a pair rotate in different directions, mobile robot 100 can perform spin turn operation.

As described above, sub wheel 2 is a member that supports mobile robot main body 3 together with the pair of driving wheels 1. As described above, sub wheel 2 is attached at the lower front of mobile robot main body 3 rotatably about an axis perpendicular to the running surface.

Range sensor 4 is a sensor that detects an object within the scan range of range sensor 4. In other words, range sensor 4 detects an object present in the periphery. In addition, range sensor 4 detects a recognition marker attached to the back side of mobile robot main body 3. Range sensor 4 is, for example, range sensor 4 using laser beams. Range sensor 4 is attached to the part of mobile robot main body 3 which is located at the frontmost along the traveling direction.

Figure 2:
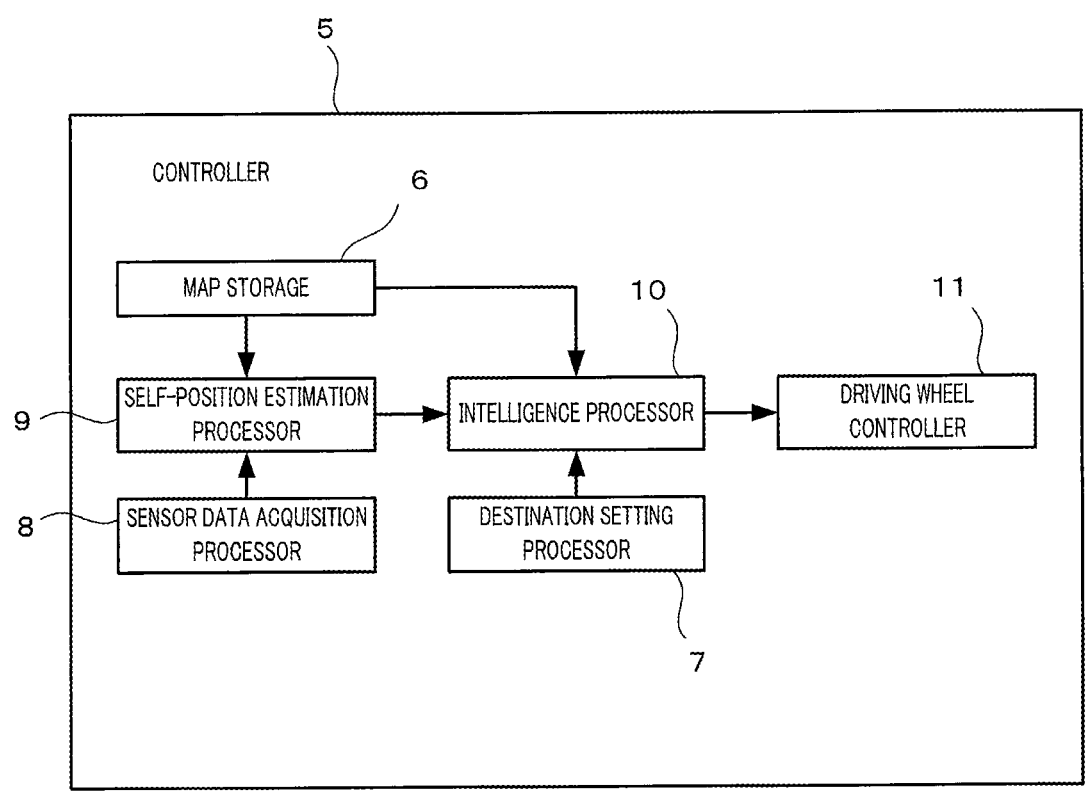
FIG. 2 is a block diagram showing one example of a controller of a mobile robot according to Embodiment 1.

FIG. 2 is a block diagram showing one example of controller 5 of mobile robot 100 according to Embodiment 1 of the present invention. Controller 5 includes map storage 6, destination setting processor 7, sensor data acquisition processor 8, self-position estimation processor 9, intelligence processor 10, and driving wheel controller 11.

Figure 3:
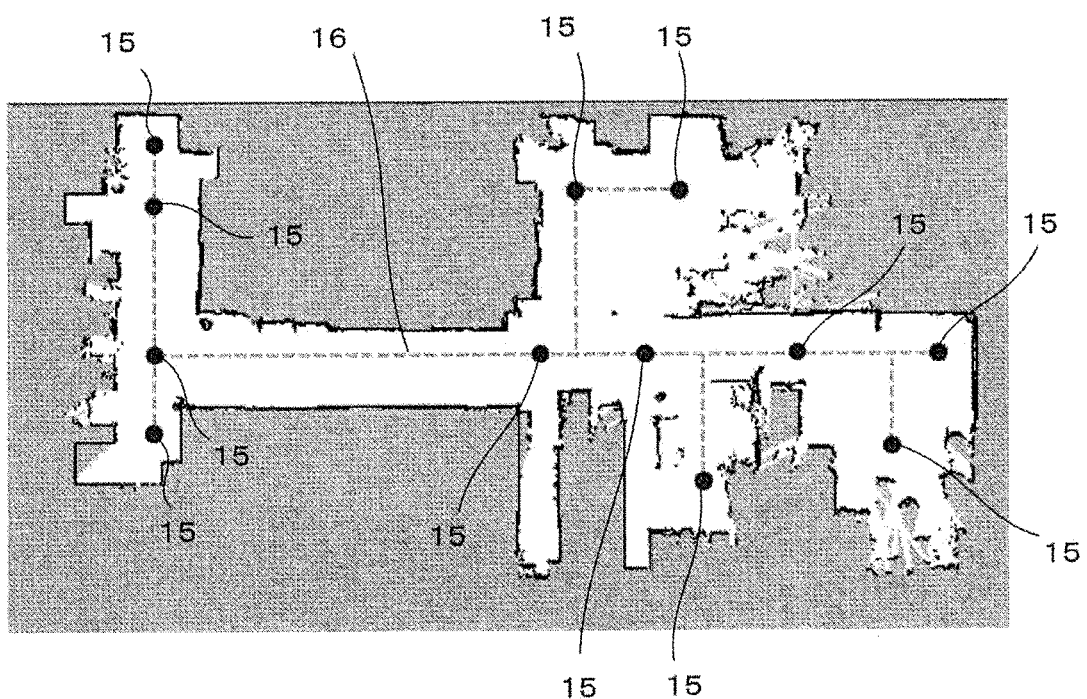
FIG. 3 is a diagram showing one example of a map indicated by map information stored in a map storage.

Map storage 6 is a storage that stores map information related to a space in which mobile robot 100 moves. FIG. 3 is a diagram showing one example of a map indicated by the map information stored in map storage 6. The map information may be two-dimensional spatial information or three-dimensional spatial information. As shown in FIG. 3, in the map information stored in map storage 6, several destinations 15 and travel path 16 connecting these destinations 15 are preset. In other words, map storage 6 stores travel path information related to mobile robot 100. Individual destination numbers are assigned to the respective destinations 15 set in the map information.

Destination setting processor 7 is a processor that registers a specific position in the map information stored in map storage 6 as a mobile destination of mobile robot 100. Destination 15 is set by setting the stored destination number corresponding to each destination 15.

Sensor data acquisition processor 8 is an input section for inputting measurement data measured by range sensor 4. The measurement data acquired by sensor data acquisition processor 8 is transmitted to self-position estimation processor 9.

Self-position estimation processor 9 is a processor that calculates information of the coordinates of the current position of mobile robot 100 based on the map information stored in map storage 6 and the measurement data acquired by sensor data acquisition processor 8.

Intelligence processor 10 receives the map information stored in map storage 6, the measurement data measured by range sensor 4, the destination number set by destination setting processor 7, information of the coordinates of the current position calculated by self-position estimation processor 9, and the like. Intelligence processor 10 is a processor that performs, for example, obstacle recognition, identification of each mobile robot 100, generation of path information related to a path along which mobile robot 100 travels, based on these received information.

Driving wheel controller 11 controls driving wheels 1 based on the path information generated by intelligence processor 10. Driving wheel controller 11 includes, for example, a servomotor, and drives driving wheels 1 through the servomotor.

Figure 4:
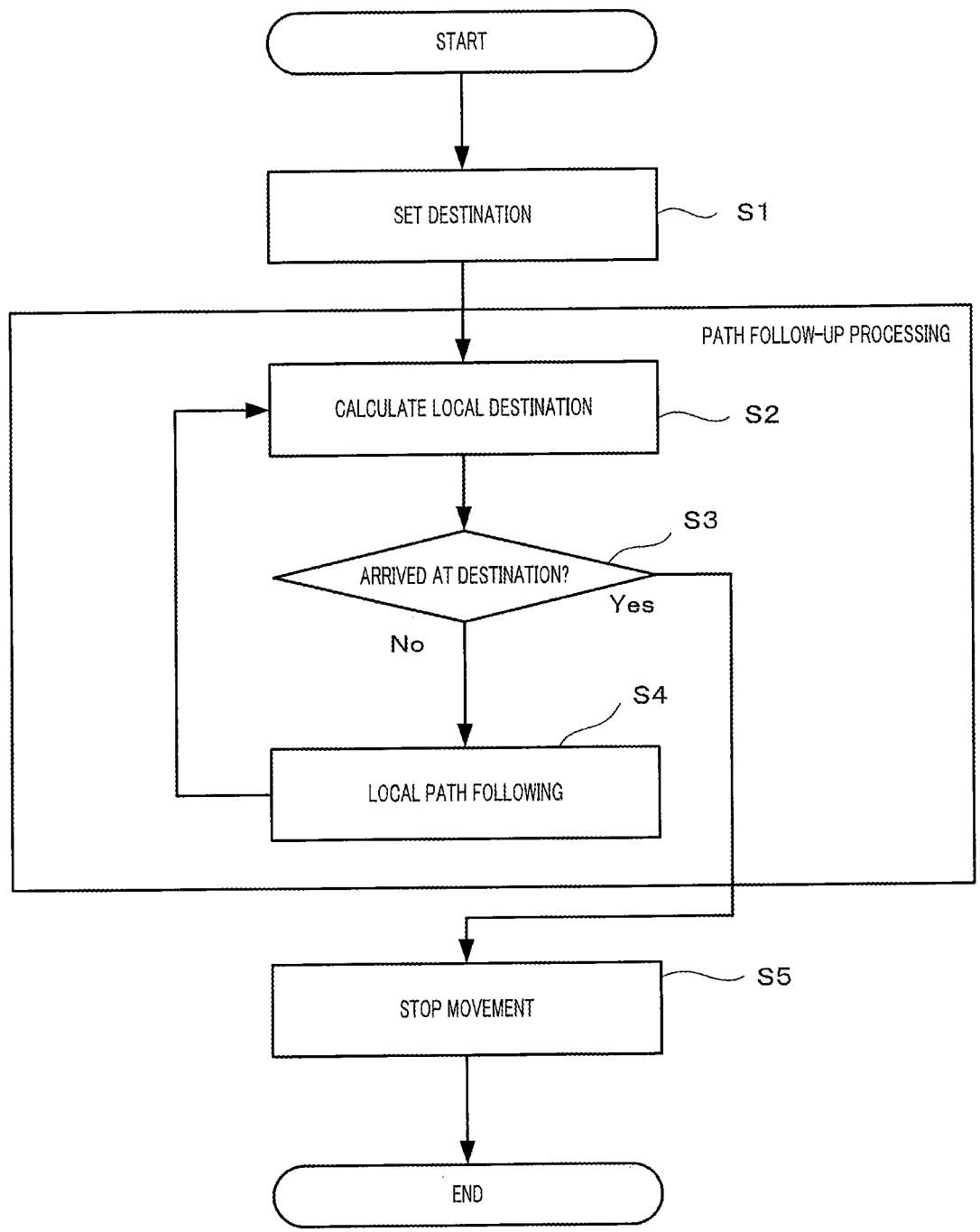
FIG. 4 is a flow chart of one example of autonomous movement control processing performed by a controller.

The autonomous mobile operation of mobile robot 100 will now be described. FIG. 4 is a flow chart of autonomous movement control processing executed by controller 5.

In this autonomous movement control processing, destination setting processor 7 first sets destination 15 (Step S1).

In this case, destination setting processor 7 transmits the destination number of destination 15 to intelligence processor 10. In addition, intelligence processor 10 acquires map information from map storage 6. Hence, intelligence processor 10 recognizes the coordinates of destination 15 toward which mobile robot 100 is going to travel, and travel path 16 to destination 15.

Path follow-up processing is then executed. This path follow-up processing allows mobile robot 100 to move along the path recognized by intelligence processor 10.

The path follow-up processing includes local destination calculation processing (Step S2), destination arrival determination processing (Step S3), and local path follow-up processing (Step S4).

In local destination calculation processing (Step S2), intelligence processor 10 calculates and sets a local destination. A local destination is the closest temporary destination to be currently reached. A specific calculation method will be explained later.

Next, in destination determination processing (Step S3), intelligence processor 10 determines whether or not mobile robot 100 has arrived at destination 15.

To be specific, intelligence processor 10 determines whether or not the local destination matches destination 15, and if they match, calculates the distance between the current position of mobile robot 100 calculated by self-position estimation processor 9, that is, the self-position and destination 15 set by destination setting processor 7.

Subsequently, if the distance is less than or equal to predetermined certain distance N, intelligence processor 10 determines that mobile robot 100 has arrived at destination 15. In contrast, when the local destination does not match destination 15 or when the distance is greater than distance N, it is determined that mobile robot 100 has not arrived at destination 15.

If it is determined that mobile robot 100 has not arrived at destination 15 (No in Step S3), in the local path follow-up processing (Step S4), intelligence processor 10 receives information about the current self-position from self-position estimation processor 9 and calculates the shortest path from the current self-position to the local destination.

Intelligence processor 10 outputs a command to driving wheel controller 11 so that mobile robot 100 travels along the calculated shortest path. Driving wheel controller 11 controls driving wheel 1 according to the command received from intelligence processor 10.

The shortest path may be calculated using, for example, the A *(a-star) algorithm. This algorithm can calculate the shortest path going around obstacles even in the event that an obstacle exists.

Further, during calculation of the shortest path from the current self-position to the local destination, intelligence processor 10 determines whether or not the distance of the shortest path from the current self-position to the local destination has become less than predetermined distance M.

When the distance of the shortest path becomes less than distance M, intelligence processor 10 determines that mobile robot 100 should temporarily stop. Intelligence processor 10 then instructs driving wheel controller 11 to stop the working of driving wheels 1. Hence, mobile robot 100 stops.

When the distance between the self-position of mobile robot 100 and the local destination becomes greater than or equal to distance M again after intelligence processor 10 determines that mobile robot 100 should temporarily stop, intelligence processor 10 determines that the movement should be restarted. In this case, intelligence processor 10 instructs driving wheel controller 11 to restart the working of driving wheels 1. Consequently, the movement of mobile robot 100 restarts.

In this way, local destination calculation processing (Step S2), destination arrival determination processing (Step S3), and local path follow-up processing (Step S4) are repeated until it is determined that mobile robot 100 has arrived at destination 15 in Step S3. Hence, mobile robot 100 gradually approaches destination 15.

When it is determined that mobile robot 100 has arrived at destination 15 in Step S3 (Yes in Step S3), intelligence processor 10 instructs driving wheel controller 11 to stop the working of driving wheels 1. Hence, the movement of mobile robot 100 stops (Step S5).

Figure 5:
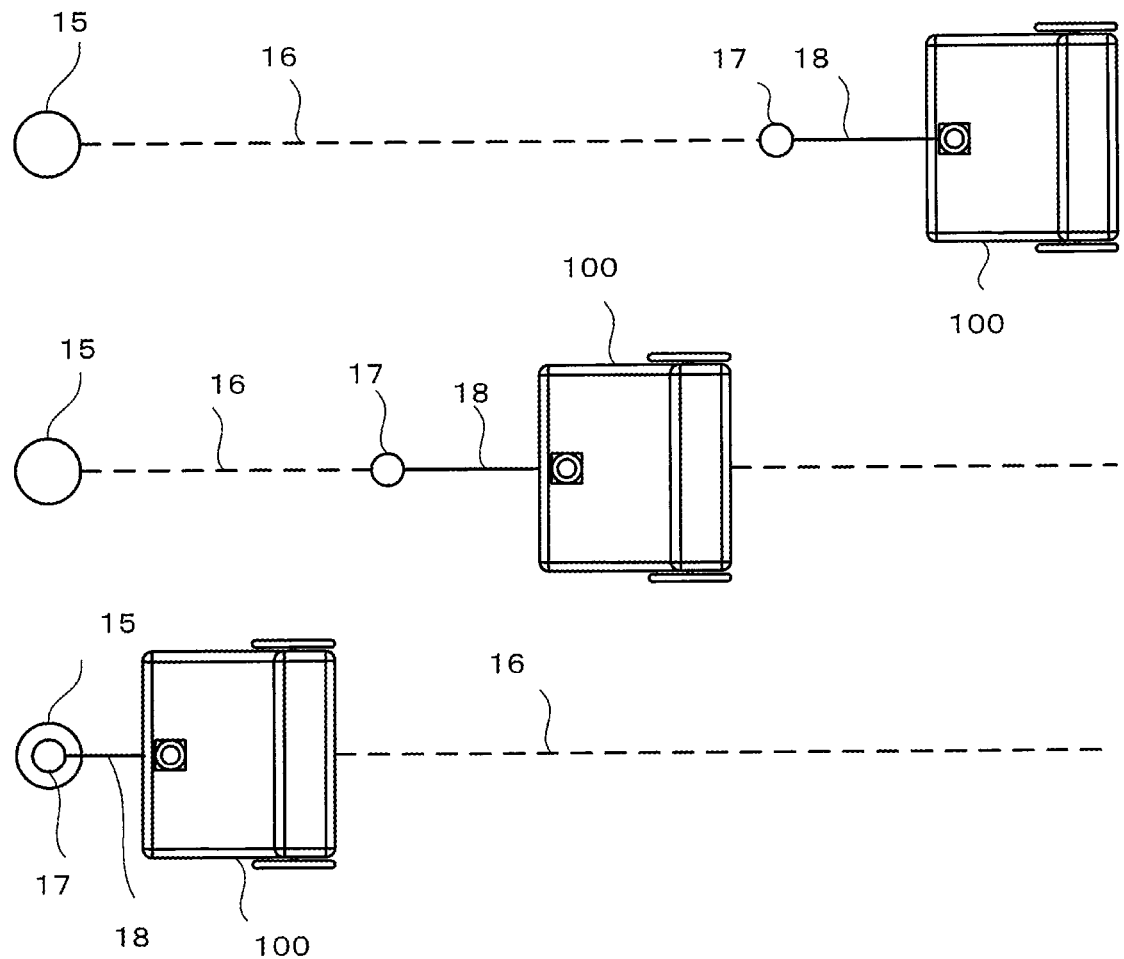
FIG. 5 is a diagram showing one example of autonomous movement of a mobile robot.

The behavior of mobile robot 100 controlled by autonomous movement control processing will now be described. FIG. 5 is an image diagram showing one example of autonomous movement of mobile robot 100 according to Embodiment 1 of the present invention. In the example shown in FIG. 5, it is assumed that destination 15 and travel path 16 have already been set in Step S1 of the autonomous movement control processing shown in FIG. 4.

The top-row diagram in FIG. 5 shows a state in which mobile robot 100 is traveling along shortest path 18 toward local destination 17 set on travel path 16 to destination 15 at time T=t1. In the middle-row diagram in FIG. 5, mobile robot 100 is traveling along shortest path 18 toward local destination 17 set on travel path 16 at time T=t2 which is after time T1.

While mobile robot 100 is traveling toward local destination 17, intelligence processor 10 repeats local destination calculation processing (Step S2), destination arrival determination processing (Step S3), and local path follow-up processing (Step S4) which have been described with reference to FIG. 4.

In the bottom-row diagram in FIG. 5, mobile robot 100 is traveling along shortest path 18 toward local destination 17, which matches destination 15, at time T=t3 which is after time T2.

In this case, intelligence processor 10 determines whether or not the distance between the current self-position of mobile robot 100 calculated by self-position estimation processor 9 and destination 15 set by destination setting processor 7 is less than or equal to distance N, thereby determining whether or not mobile robot 100 has arrived at destination 15.

Figure 6:
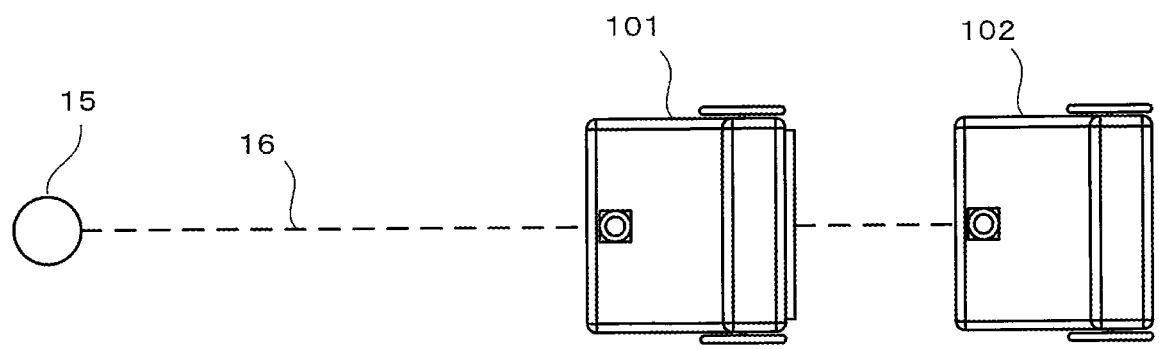
FIG. 6 is a diagram showing an image of formation traveling of mobile robots.

Formation traveling using multiple mobile robots 100 will now be described. FIG. 6 is a diagram showing an image of formation traveling of mobile robots 100 according to an embodiment of the present invention. Here, two mobile robots 101 and 102 travel in formation as an example.

Figure 7:
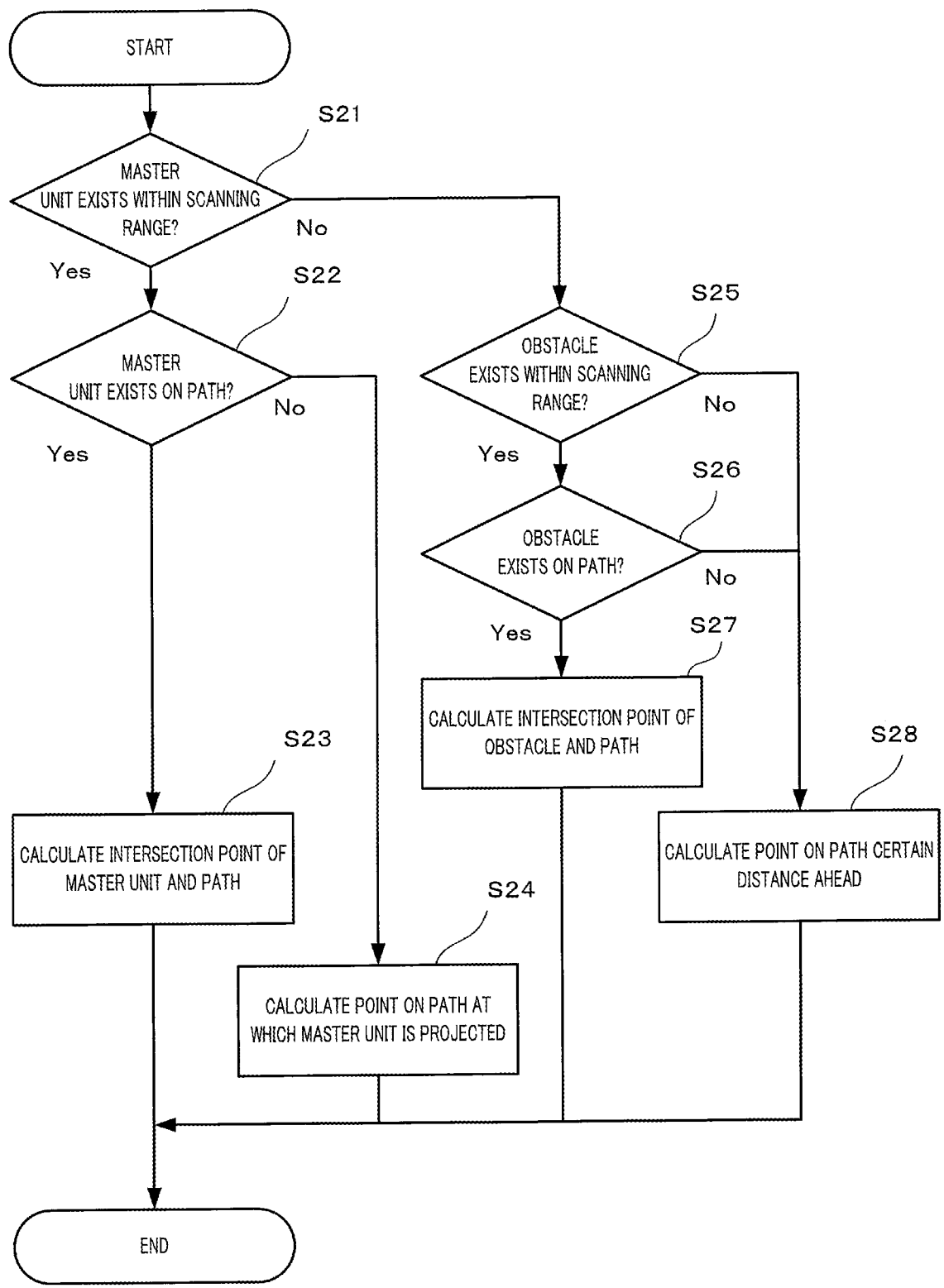
FIG. 7 is a flow chart showing one example of local destination calculation processing for a mobile robot according to Embodiment 1.

Mobile robot 101 is a master unit to be followed and mobile robot 102 is a following slave unit. First, local destination calculation processing (Step S2) described in FIG. 4 will be described in more detail. FIG. 7 is a flow chart showing local destination calculation processing.

In local destination calculation processing, first, intelligence processor 10 determines whether or not mobile robot 101, which is a master unit, exists within the scanning range of range sensor 4 (Step S21).

Whether or not mobile robot 101 serving as the master unit exists within the scanning range is determined depending on whether or not range sensor 4 has detected recognition marker 12 attached to the back side of mobile robot 101 within the scanning range.

Figure 8:
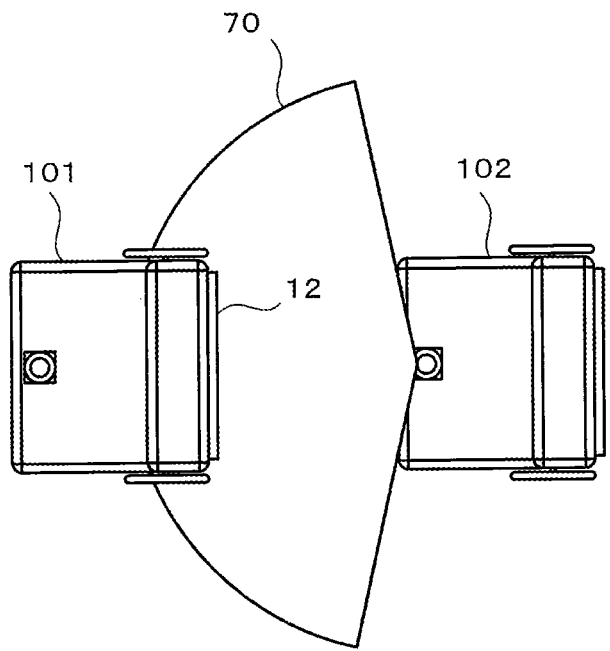
FIG. 8 shows an image in which a range sensor detects a recognition mark within a scanning range.

FIG. 8 shows an image in which range sensor 4 detects recognition marker 12 within scanning range 70. In the case where recognition marker 12 attached to mobile robot 101 serving as a master unit exists within scanning range 70 of range sensor 4 provided in mobile robot 102 serving as a slave unit, recognition marker 12 on master unit 101 is detected by range sensor 4 of mobile robot 102 serving as a slave unit.

When mobile robot 101 serving as a master unit exists within scanning range 70 of range sensor 4 (Yes in Step S21), intelligence processor 10 determines whether or not recognition marker 12 exists on travel path 16 of mobile robot 102 serving as a slave unit (Step S22).

When it is determined that recognition marker 12 exists on travel path 16 of mobile robot 102 serving as a slave unit (Yes in Step S22), intelligence processor 10 calculates the intersection point of mobile robot 101 serving as a master unit and travel path 16 of mobile robot 102 serving as a slave unit, sets the intersection point as local destination 17 (Step S23), and terminates the local destination calculation processing.

When it is determined that recognition marker 12 does not exist on travel path 16 of mobile robot 102 serving as a slave unit (No in Step S22), intelligence processor 10 calculates the point on travel path 16 at which mobile robot 101 serving as a master unit is projected, sets that point as local destination 17 (Step S24), and terminates the local destination calculation processing.

When recognition marker 12 is not detected within scanning range 70 of range sensor 4 (No in Step S21), intelligence processor 10 determines the presence or absence of any obstacle other than the master unit having recognition marker 12 within scanning range 70 of range sensor 4 (Step S25).

Figure 9:
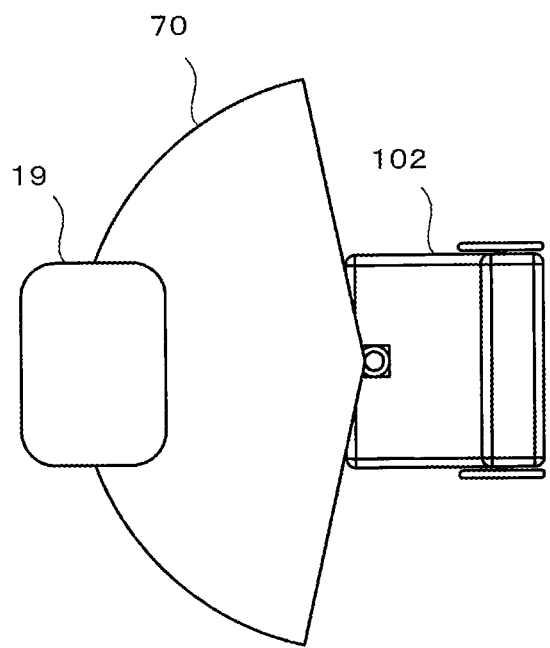
FIG. 9 shows an image in which the range sensor detects an obstacle within the scanning range.

FIG. 9 shows an image in which range sensor 4 detects obstacle 19 within scanning range 70. In the case where obstacle 19 exists within scanning range 70 of range sensor 4, obstacle 19 is detected by range sensor 4 of mobile robot 102 serving as a slave machine.

When obstacle 19 exists within scanning range 70 of range sensor 4 provided on mobile robot 102 serving as a slave unit (Yes in Step S25), intelligence processor 10 determines whether or not obstacle 19 exists on travel path 16 of mobile robot 102 serving as a slave unit (Step S26).

When it is determined that obstacle 19 exists on travel path 16 of mobile robot 102 serving as a slave unit (Yes in Step S26), intelligence processor 10 calculates the intersection point of obstacle 19 and that travel path 16, sets the intersection point as local destination 17 (Step S27), and terminates the local destination calculation processing.

The reason for setting local destination 17 as the intersection point of obstacle 19 and travel path 16 is that when obstacle 19 is detected on travel path 16, that obstacle 19 is highly possibly a person or other moving objects. Suppose, for example, that a person walking across travel path 16 is detected on travel path 16 during formation traveling. In this case, if mobile robot 101 serving as a master unit and mobile robot 102 serving as a slave unit each try to go around the walking person, the formation of mobile robots 101 and 102 may collapse. Therefore, when obstacle 19 is detected on travel path 16, intelligence processor 10 temporarily sets local destination 17 on travel path 16. In this case, when the person moves from travel path 16 to out of scanning range 70, mobile robots 101 and 102 restart to move.

When obstacle 19 does not exist within scanning range 70 of range sensor 4 of mobile robot 102 serving as a slave unit (No in Step S25), intelligence processor 10 calculates the position on travel path 16 a certain distance ahead, sets the position as local destination 17 (Step S28), and terminates the local destination calculation processing.

Similarly, when obstacle 19 detected by range sensor 4 does not exist on travel path 16 of mobile robot 102 serving as a slave unit (No in Step S26), intelligence processor 10 sets local destination 17 to a position a predetermined distance ahead on that travel path 16 (Step S28). However, if intelligence processor 10 determines that mobile robot 102 serving as a slave unit will collide with obstacle 19 before reaching the position on travel path 16 a certain distance ahead, mobile robot 102 goes around obstacle 19 and travels to local destination 17 that is set a certain distance ahead.

Next, a method of calculating local destination 17 in processing of Steps S23, S24, S27, and S28 shown in FIG. 7 will be described.

Figure 10:
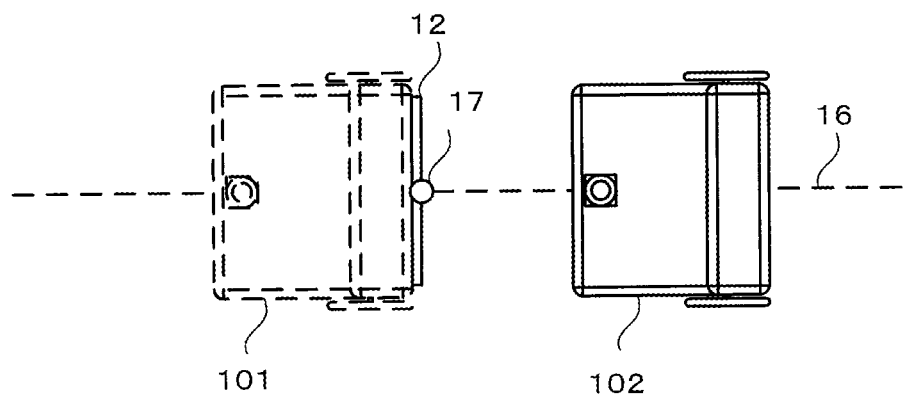
FIG. 10 is a diagram showing an image in which the intersection point of a mobile robot serving as a master unit and the travel path of a mobile robot serving as a slave unit is set as local destination.

FIG. 10 is a diagram showing an image in which the intersection point of mobile robot 101 serving as a master unit and travel path 16 of mobile robot 102 serving as a slave unit is set as local destination 17 by intelligence processor 10.

As shown in FIG. 10, in Step S23, the intersection of travel path 16 of mobile robot 102 serving as a slave unit and recognition marker 12 is set as local destination 17.

Figure 11:
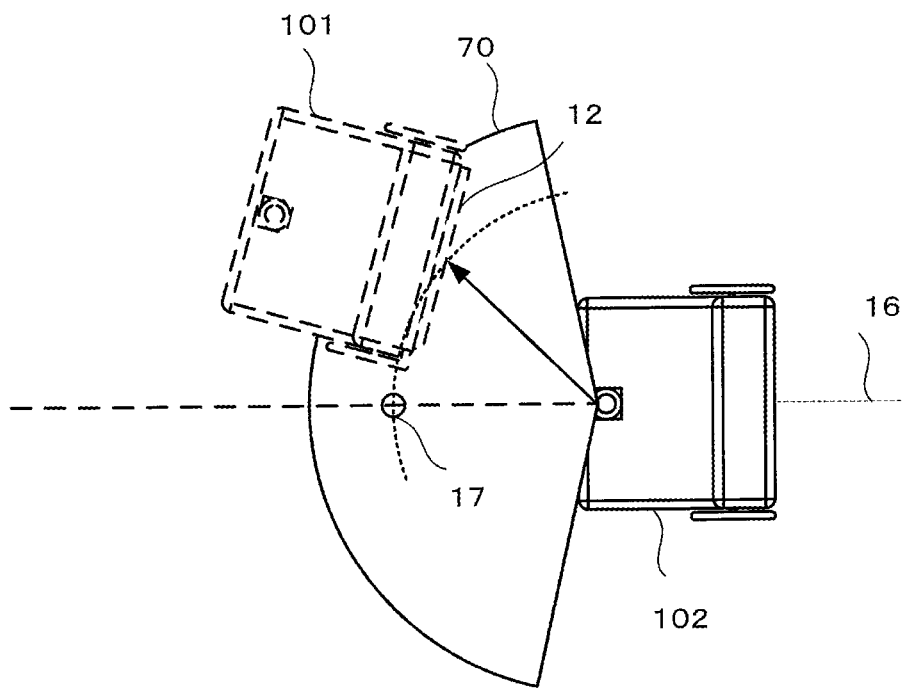
FIG. 11 is a diagram showing an example of setting a point on the travel path of a mobile robot serving as a slave unit at which a mobile robot serving as a master unit is projected, as a local destination.
Figure 12:
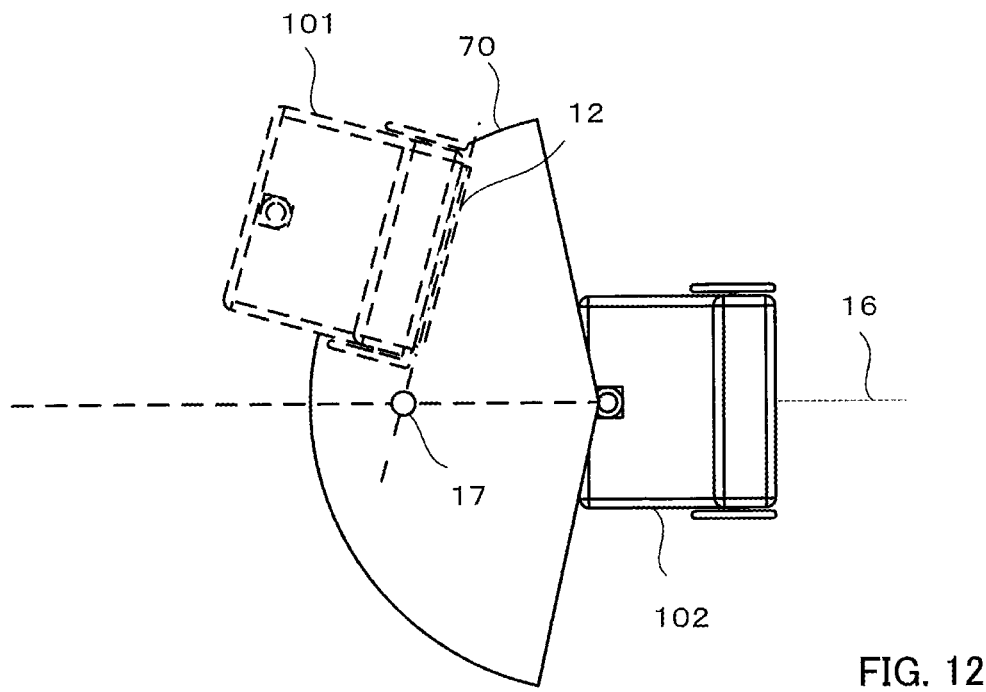
FIG. 12 is a diagram showing another example of setting a point on the travel path of a mobile robot serving as a slave unit at which a mobile robot serving as a master unit is projected, as a local destination.
Figure 13:
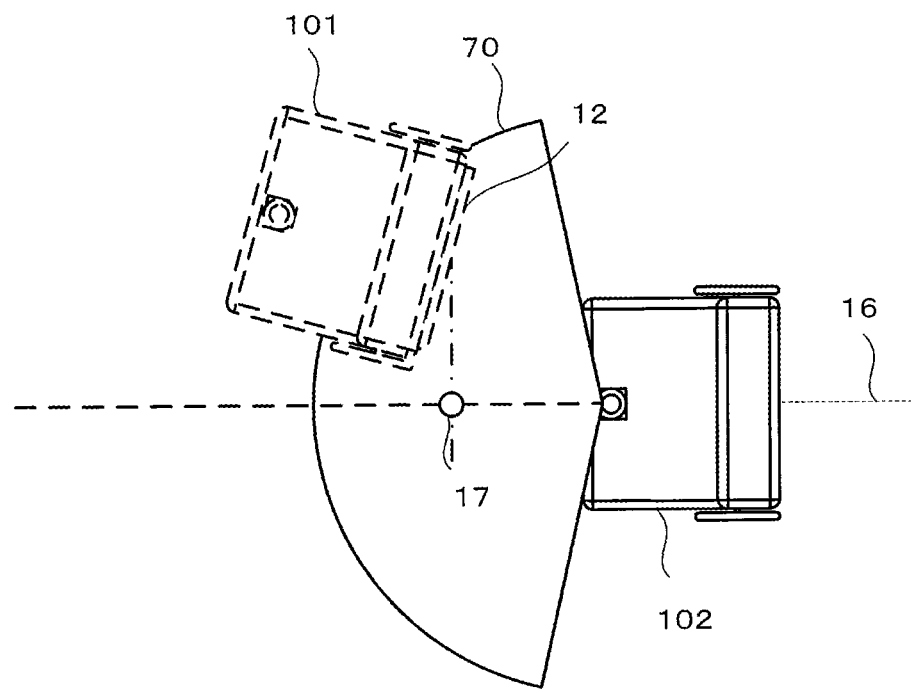
FIG. 13 is a diagram showing still another example of setting a point on the travel path of a mobile robot serving as a slave unit at which a mobile robot serving as a master unit is projected, as a local destination.

FIGS. 11 to 13 are diagrams showing an image in which mobile robot 101 serving as a master unit is projected at a point on travel path 16 of mobile robot 102 serving as a slave unit, and the point is set as local destination 17 by intelligence processor 10.

As shown in FIG. 11, in Step S24, the distance between the position (for example, the midpoint of recognition marker 12) of mobile robot 101 serving as a master unit and the position of mobile robot 102 serving as a slave unit (for example, the center of range sensor 4) is calculated, and an arc having the distance as a radius and centered on the center of range sensor 4 is drawn. Subsequently, the intersection point of this arc and travel path 16 of mobile robot 102 serving as a slave unit is set as local destination 17.

The intersection point of travel path 16 and a straight line extending perpendicularly to the travel direction of mobile robot 100 from the position of mobile robot 100 may be set as local destination 17. For example, as shown in FIG. 12, a straight line connecting the leftmost point and the rightmost point of recognition marker 12 is drawn as viewed from mobile robot 102 serving as a slave unit is drawn, and the intersection point of the straight line and travel path 16 of mobile robot 102 serving as a slave unit may be set as local destination 17.

Alternatively, as shown in FIG. 13, a perpendicular may be drawn from the midpoint of recognition marker 12 to travel path 16 of mobile robot 102 serving as a slave unit, and the intersection point of the perpendicular and that travel path 16 may be set as local destination 17.

Figure 14:
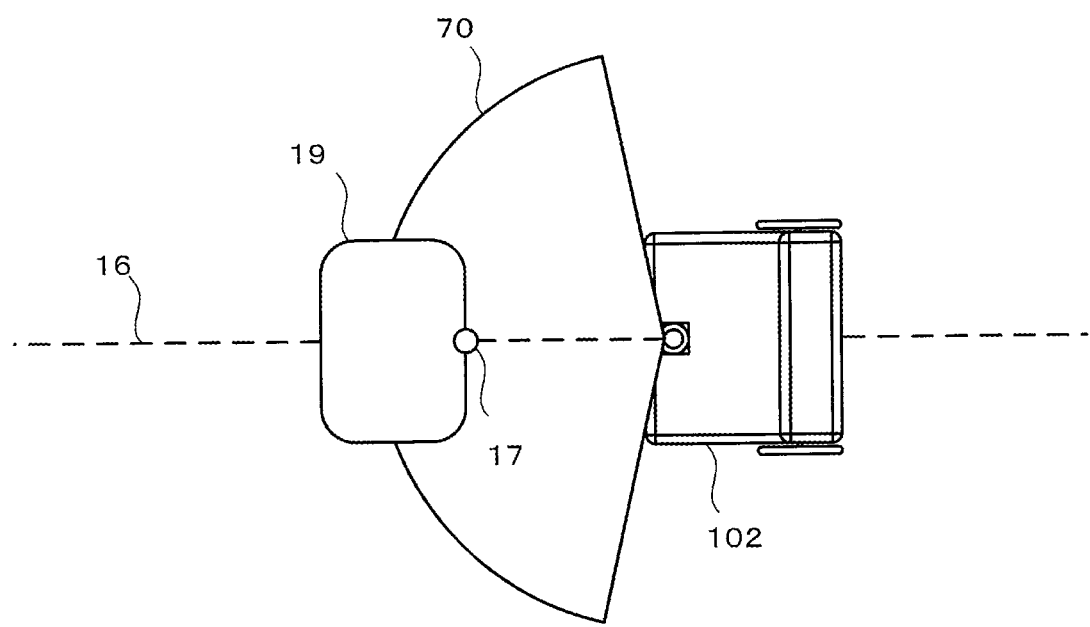
FIG. 14 is a diagram showing an image of calculation of local destination in Step S27.

FIG. 14 is a diagram showing an image of calculation of local destination 17 in Step S27. In Step S27, as shown in FIG. 14, the intersection point of obstacle 19 and travel path 16 of mobile robot 102 serving as a slave unit is set as local destination 17.

In Step S28, as described above, the position certain distance L ahead of the current position of mobile robot 102 serving as a slave unit along travel path 16 is set as local destination 17.

Figure 15A:
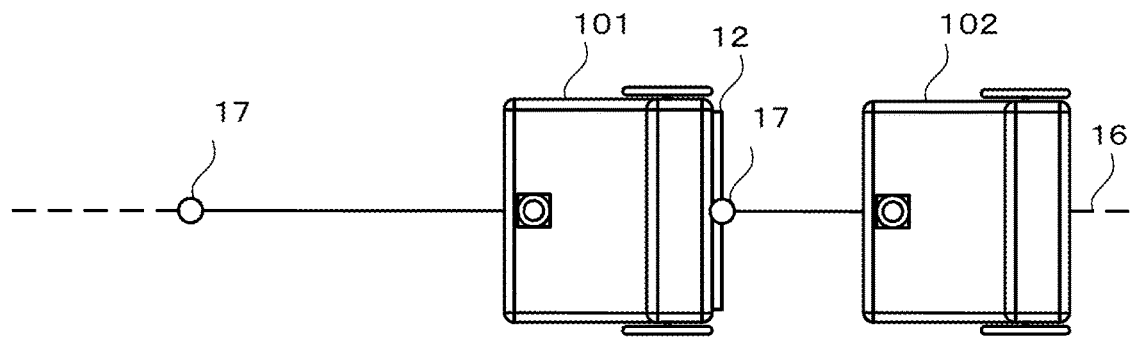
FIGS. 15A to 15C are diagrams showing an image of formation traveling of mobile robots.
Figure 15B:
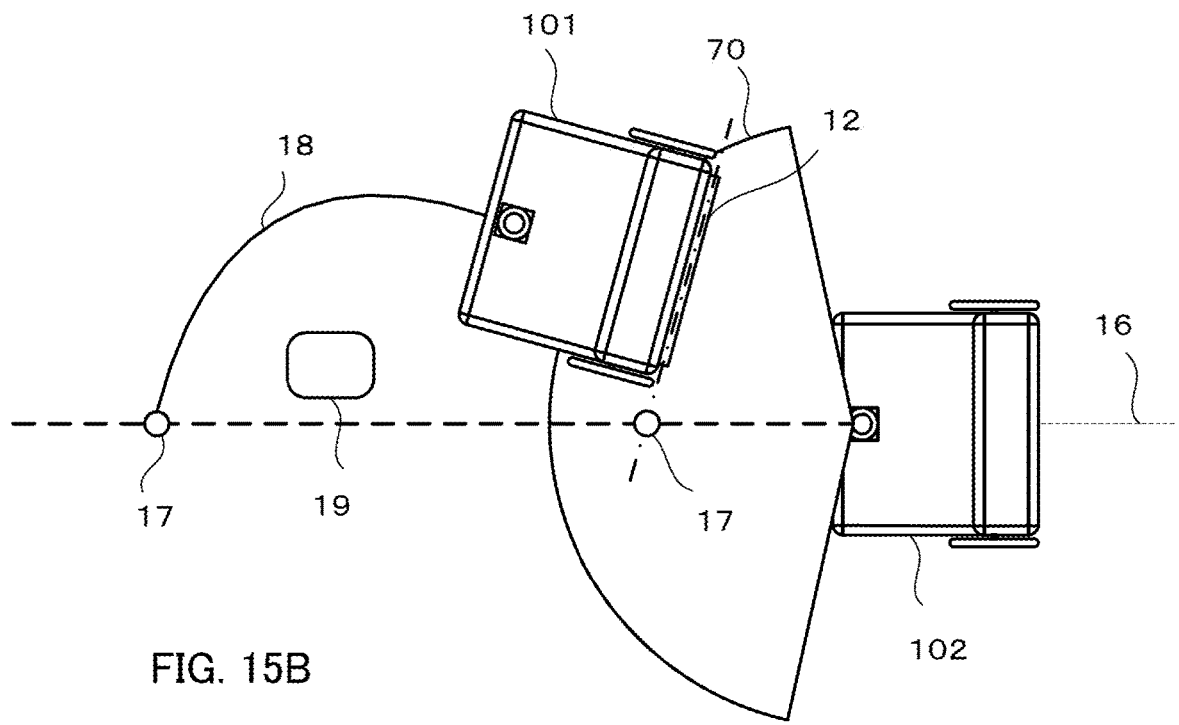
Figure 15C:
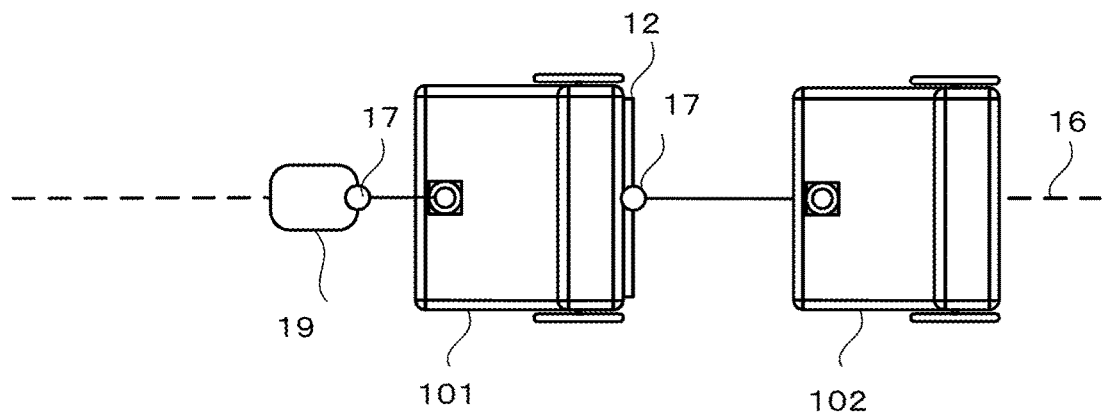
Figure 16:
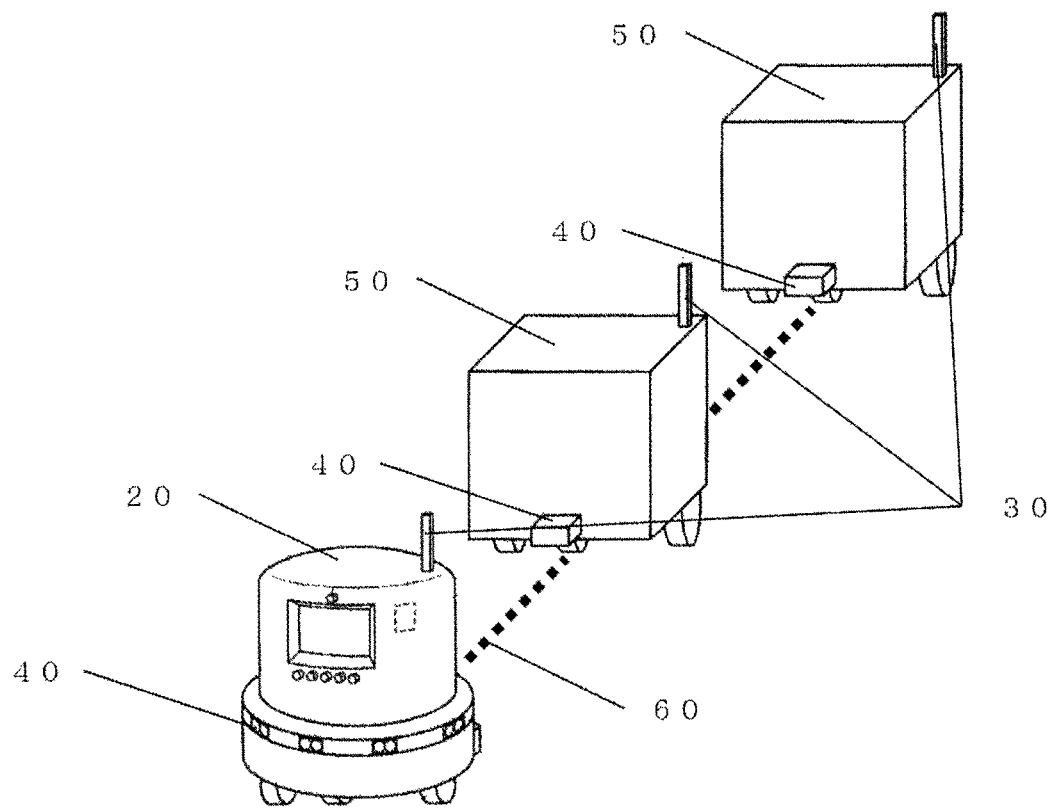
FIG. 16 is a diagram showing an image of multiple movable bodies travelling along the same path in formation according to PTL 1.

Formation traveling will now be described in detail. FIGS. 15A to 15C are diagrams showing an image of formation traveling of mobile robots 100 according to an embodiment of the present invention.

FIG. 15A shows a state in which obstacle 19 does not exist on travel path 16 of mobile robot 101. Since obstacle 19 does not exist on travel path 16, mobile robot 101 serving as a master unit calculates local destination 17 in the processing of Step S28 and autonomously moves.

On the other hand, mobile robot 102 serving as a slave unit, which has detected recognition marker 12 on mobile robot 101 serving as a master unit on travel path 16, calculates local destination 17 in the processing of Step S23 and autonomously moves.

FIG. 15B shows a state in which obstacle 19 exists near travel path 16 and mobile robot 101 serving as a master unit temporarily deviates from travel path 16.

Since obstacle 19 does not exist on travel path 16, mobile robot 101 serving as a master unit performs calculation so that local destination 17 is located on travel path 16 in the processing of Step S28 and autonomously moves.

However, when intelligence processor 10 determines that the mobile robot will collide with obstacle 19 if the mobile robot keeps going along travel path 16, shortest path 18 to local destination 17 is a path that goes around obstacle 19 in order to avoid collision with obstacle 19. In other words, intelligence processor 10 of mobile robot 101 serving as a master unit determines to perform operation for going around obstacle 19.

On the other hand, mobile robot 102 serving as a slave unit, which has detected recognition marker 12 in scanning range 70 of range sensor 4, calculates local destination 17 in the processing of Step S24 and autonomously moves. In other words, mobile robot 102 serving as a slave unit sets a point on travel path 16 at which mobile robot 101 serving as a master unit is projected, as local destination 17, and autonomously moves. Accordingly, mobile robot 102 serving as a slave unit does not travel ahead of the point on travel path 16 at which mobile robot 101 serving as a master unit is projected. In other words, mobile robot 102 serving as a slave unit never passes mobile robot 101 serving as a master unit.

When mobile robot 101 serving as a master unit advances along shortest path 18 and mobile robot 102 serving as a slave unit further advances along travel path 16, intelligence processor 10 of mobile robot 102 serving as a slave unit determines that mobile robot 102 will collide with obstacle 19. In this case, like in mobile robot 101 serving as a master unit, shortest path 18 for avoiding collision with obstacle 19 is set in mobile robot 102 serving as a slave unit.

When mobile robot 102 serving as a slave unit advances along travel path 16 and range sensor 4 detects obstacle 19, like in mobile robot 101 serving as a master unit, shortest path 18 to local destination 17 is set to a path that goes around obstacle 19. In other words, intelligence processor 10 of mobile robot 102 serving as a slave unit also determines to perform operation for going around obstacle 19.

FIG. 15C shows a state in which obstacle 19 exists on travel path 16. Since obstacle 19 exists on travel path 16, mobile robot 101 serving as a master unit calculates local destination 17 in the processing of Step S27 and autonomously moves.

At this time, the distance between the current position of mobile robot 101 serving as a master unit and local destination 17 is less than certain distance M, so that mobile robot 101 temporarily stops.

On the other hand, mobile robot 102 serving as a slave unit, which has detected recognition marker 12 on the master unit on travel path 16, calculates local destination 17 in the processing of Step S24 and autonomously moves.

At this time, mobile robot 101 serving as a master unit temporarily stops and the distance between the current position of mobile robot 102 serving as a slave unit and local destination 17 is less than certain distance M, so that mobile robot 102 temporarily stops.

Subsequently, if this obstacle 19 moves from travel path 16, obstacle 19 is no longer present on travel path 16 as shown in FIG. 15A, so that mobile robot 101 serving as a master unit calculates local destination 17 in the processing of Step S28.

At this time, since the distance between the current position of mobile robot 101 serving as a master unit and local destination 17 is greater than or equal to certain distance M, mobile robot 101 serving as a master unit restarts to autonomously move.

Meanwhile, since mobile robot 101 serving as a master unit restarts to autonomously move, the distance between local destination 17 and the position of mobile robot 102 serving as a slave unit becomes greater than or equal to certain distance M, so that mobile robot 102 serving as a slave unit also restarts to autonomously move.

With the above-described processing, even in an environment in which a moving obstacle such as an air terminal exists in the periphery, follow-up control on multiple mobile robots 100 can be achieved while multiple mobile robots 100 are made travel along the same track in formation.

Embodiment 1 of the present invention provides a configuration for identifying each mobile robot 100, in which range sensor 4 detects recognition marker 12 and intelligence processor 10 recognizes mobile robot 100, as described above. However, this is not necessarily the case. For example, range sensor 4 may detect the outer shape of mobile robot 100 to acquire shape data, and thus recognize mobile robot 100.

Embodiment 2 of the present invention will now be described. In the local destination calculation processing according to Embodiment 2, the presence or absence of mobile robot 101 within scanning range 70 of range sensor 4 is determined based on positional information about an object to be detected by range sensor 4 and information about the self-positions of mobile robots 101 and 102 shared between mobile robots 101 and 102. Here, a self-position is, for example, the laterally central position of the back side of each of mobile robots 101 and 102 when mobile robots 101 and 102 are supposed to travel toward the front.

Figure 17:
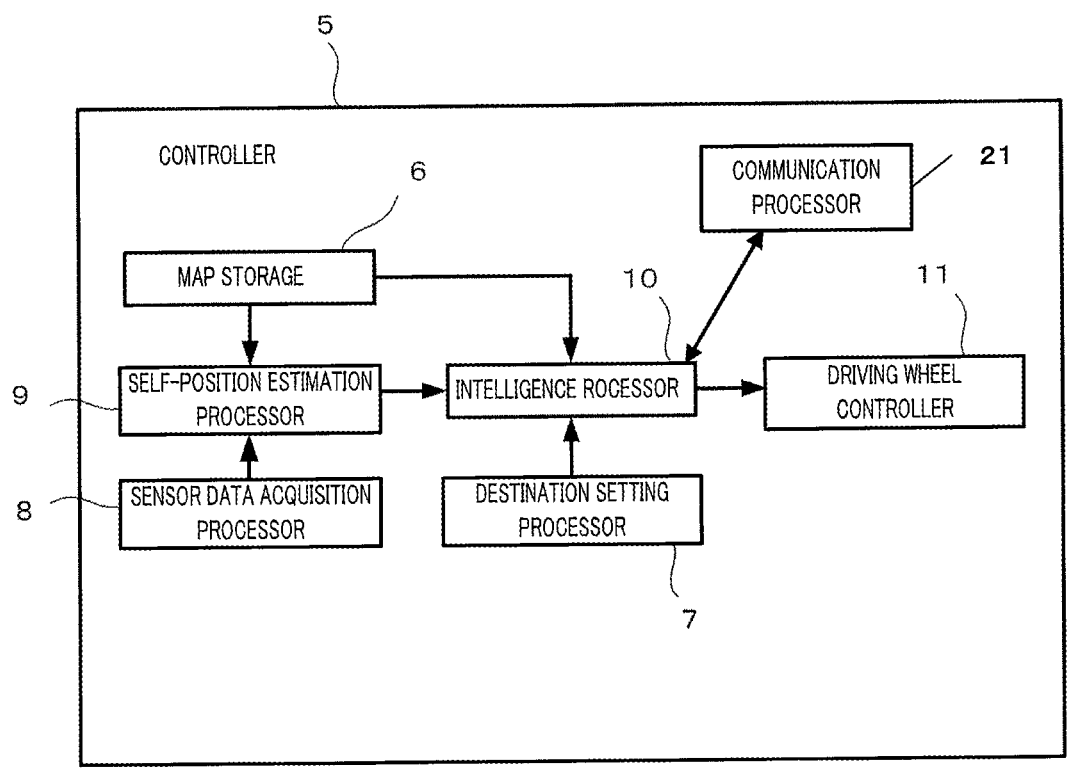
FIG. 17 is a block diagram showing one example of a controller of a mobile robot according to Embodiment 2.

FIG. 17 is a block diagram showing one example of controller 5 according to Embodiment 2 of the present invention. Controller 5 includes map storage 6, destination setting processor 7, sensor data acquisition processor 8, self-position estimation processor 9, intelligence processor 10, driving wheel controller 11, and communication processor 21.

map storage 6, destination setting processor 7, sensor data acquisition processor 8, self-position estimation processor 9, intelligence processor 10, and driving wheel controller 11 are similar to those in Embodiment 1.

Communication processor 21 is a communication apparatus used for information communication between mobile robots 101 and 102 while multiple mobile robots 101 and 102 travel in formation. For example, communication processors 21 transmit/receive information about self-positions to/from each other.

A method of calculating local destination 17 when mobile robots 101 and 102 according to Embodiment 2 travel in formation will now be explained. As shown in FIG. 6, here, two mobile robots 101 and 102 travel in formation as an example.

Figure 18:
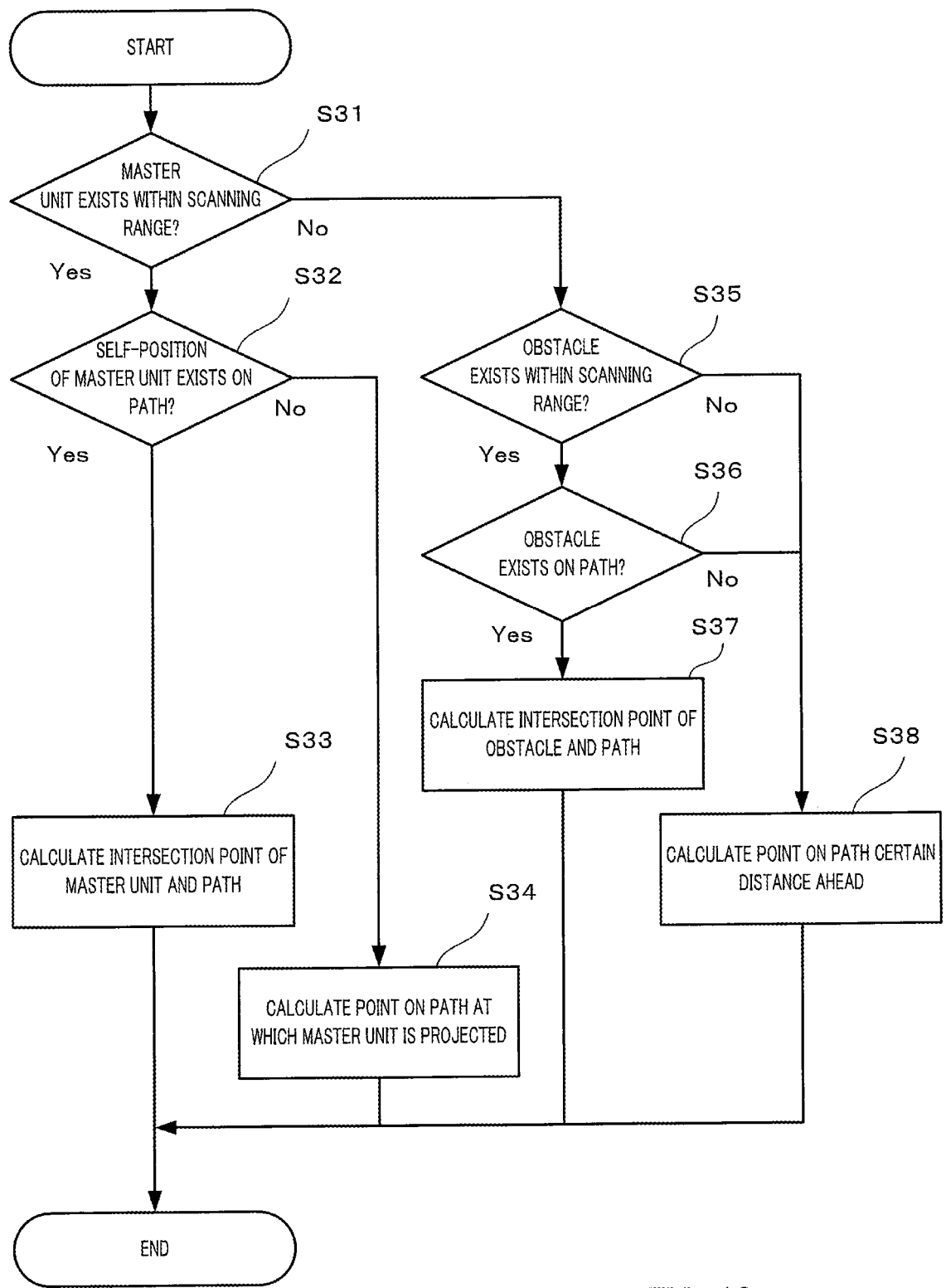
FIG. 18 is a flow chart showing one example of local destination calculation processing for a mobile robot according to Embodiment 2.

Mobile robot 101 is a master unit to be followed and mobile robot 102 is a following slave unit. Information about self-positions estimated in self-position estimation processor 9 is transmitted and received between mobile robot 101 serving as a master unit and mobile robot 102 serving as a slave unit via communication processors 21, and mobile robots 101 and 102 share information about their self-positions. FIG. 18 is a flow chart showing local destination calculation processing.

In local destination calculation processing, first, intelligence processor 10 determines whether or not mobile robot 101, which is a master unit, exists within scanning range 70 of range sensor 4 (Step S31).

Whether or not mobile robot 101 serving as a master unit exists within scanning range 70 is determined in the following manner. First, intelligence processor 10 calculates the distance between the self-position of mobile robot 101 and the self-position of mobile robot 102, which are shared between mobile robots 101 and 102. This distance is referred to as "estimated distance" for convenience.

Next, based on the distance between range sensor 4 and an object detected in the position closest to range sensor 4 within scanning range 70 of range sensor 4, intelligence processor 10 calculates the distance between the object and the position of mobile robot 102. This distance is referred to as "detected distance" for convenience. Here, the position of mobile robot 102 is, for example, the laterally central position of the back side of mobile robot 102 when mobile robot 102 is supposed to travel toward the front.

Finally, intelligence processor 10 determines whether or not the difference between the estimated distance and the detected distance is less than or equal to a predetermined threshold. When the difference between the value of the estimated distance and the value of the detected distance is less than or equal to a predetermined threshold, that is, when the difference between the value of the estimated distance and the value of the detected distance is small or zero, it is determined that mobile robot 101 serving as a master unit exists within scanning range 70.

Through this processing, whether or not mobile robot 101 serving as a master unit exists within scanning range 70 of range sensor 4 is determined.

Note that intelligence processor 10 may be configured to recognize mobile robot 101 serving as a master unit, based on the self-position of mobile robot 101 and the self-position of mobile robot 102 which are shared between mobile robots 101 and 102.

Figure 19:
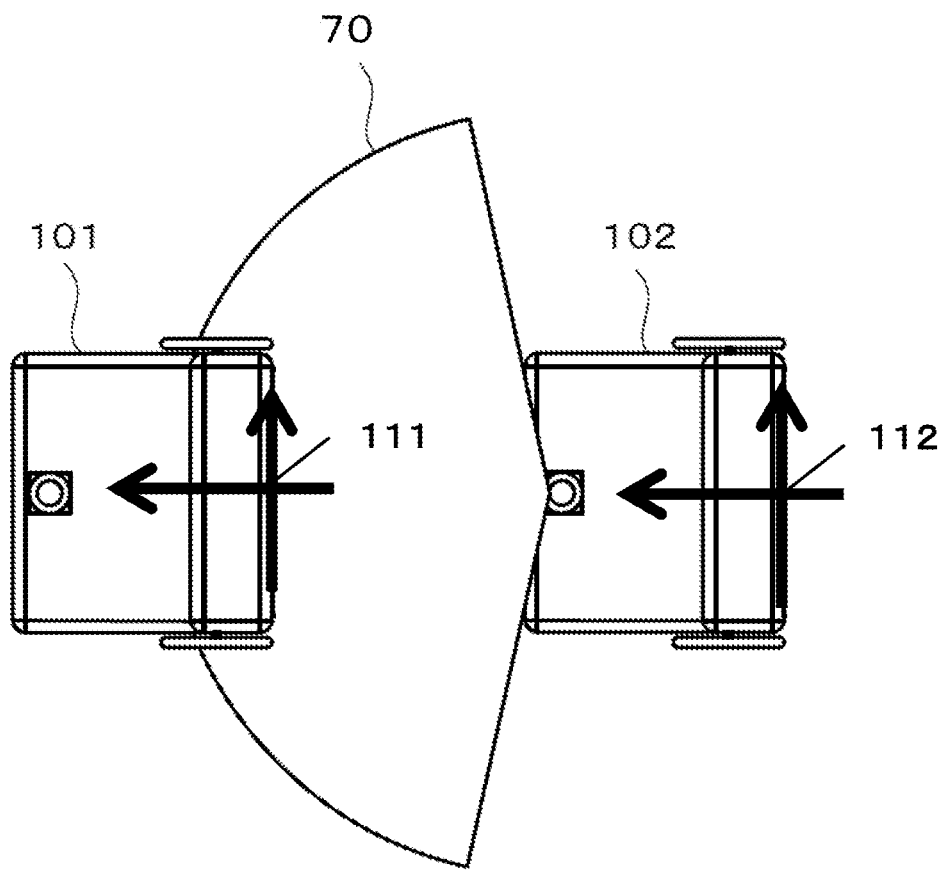
FIG. 19 shows an image in which a range sensor detects a mobile robot within a scanning range.

FIG. 19 shows an image in which the distance between self-position 111 of mobile robot 101 and self-position 112 of mobile robot 102, that is, the estimated distance matches the distance between mobile robot 102 and the detected object that has been detected in the position closest to range sensor 4 within scanning range 70, that is, the detected distance. When mobile robot 101 serving as a master unit exists within scanning range 70 of range sensor 4 provided on mobile robot 102 serving as a slave unit and self-positions 111 and 112 estimated by self-position estimation processor 9 are not deviated from the actual positions of mobile robots 101 and 102, the distance between the detected positions of mobile robot 101 serving as a master unit and mobile robot 102 serving as a slave unit matches the distance between self-position 111 of mobile robot 101 and self-position 112 of mobile robot 102.

Returning to description of FIG. 18, when mobile robot 101 serving as a master unit exists within scanning range 70 of range sensor 4 (Yes in Step S31), intelligence processor 10 determines whether or not self-position 111 of mobile robot 101 exists on travel path 16 of mobile robot 102 serving as a slave unit (Step S32).

When it is determined that self-position 111 of mobile robot 101 exists on travel path 16 of mobile robot 102 serving as a slave unit (Yes in Step S32), intelligence processor 10 calculates the intersection point of mobile robot 101 serving as a master unit and travel path 16 of mobile robot 102 serving as a slave unit, sets the intersection point as local destination 17 (Step S33), and terminates the local destination calculation processing.

When it is determined that self-position 111 of mobile robot 101 does not exist on travel path 16 of mobile robot 102 serving as a slave unit (No in Step S32), intelligence processor 10 calculates the point on the travel path 16 at which mobile robot 101 serving as a master unit is projected, sets that point as local destination 17 (Step S34), and terminates the local destination calculation processing.

When it is determined that mobile robot 101 serving as a master unit does not exist within scanning range 70 (No in Step S31), intelligence processor 10 determines the presence or absence of any obstacle 19 other than the master unit within scanning range 70 of range sensor 4 (Step S35).

When obstacle 19 exists within scanning range 70 of range sensor 4 provided on mobile robot 102 serving as a slave unit (Yes in Step S35), intelligence processor 10 determines whether or not obstacle 19 exists on travel path 16 of mobile robot 102 serving as a slave unit (Step S36).

When it is determined that obstacle 19 exists on travel path 16 of mobile robot 102 serving as a slave unit (Yes in Step S36), intelligence processor 10 calculates the intersection point of obstacle 19 and that travel path 16, sets the intersection point as local destination 17 (Step S37), and terminates the local destination calculation processing.

When obstacle 19 does not exist within scanning range 70 of range sensor 4 of mobile robot 102 serving as a slave unit (No in Step S35), intelligence processor 10 calculates the position on travel path 16 a certain distance ahead, sets the position as local destination 17 (Step S38), and terminates the local destination calculation processing.

Similarly, when obstacle 19 detected by range sensor 4 does not exist on travel path 16 of mobile robot 102 serving as a slave unit (No in Step S36), intelligence processor 10 sets local destination 17 to a position a certain distance ahead on that travel path 16 (Step S38). However, if intelligence processor 10 determines that mobile robot 102 serving as a slave unit will collide with obstacle 19 before reaching the position on travel path 16 a certain distance ahead, mobile robot 102 goes around obstacle 19 and travels to local destination 17 that is set a certain distance ahead.

Next, a method of calculating local destination 17 in processing of Steps S33, S34, S37, and S38 shown in FIG. 18 will be described.

Figure 20:
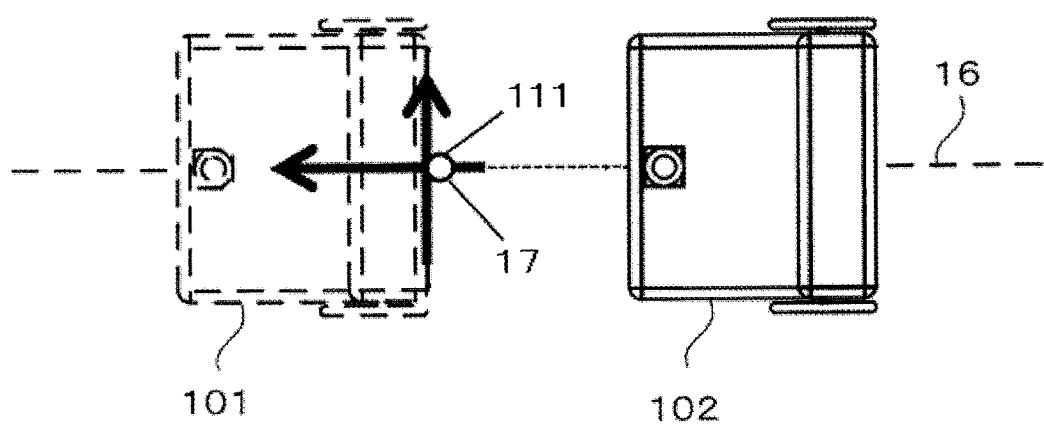
FIG. 20 is a diagram showing an image in which the intersection point of a mobile robot serving as a master unit and the travel path of a mobile robot serving as a slave unit is set as local destination.

FIG. 20 is a diagram showing an image in which the intersection point of the mobile robot 101 serving as a master unit and travel path 16 of mobile robot 102 serving as a slave unit is set as local destination 17 by intelligence processor 10.

As shown in FIG. 20, in Step S33, the intersection of travel path 16 of mobile robot 102 serving as a slave unit and self-position 111 of mobile robot 101 is set as local destination 17.

Figure 21:
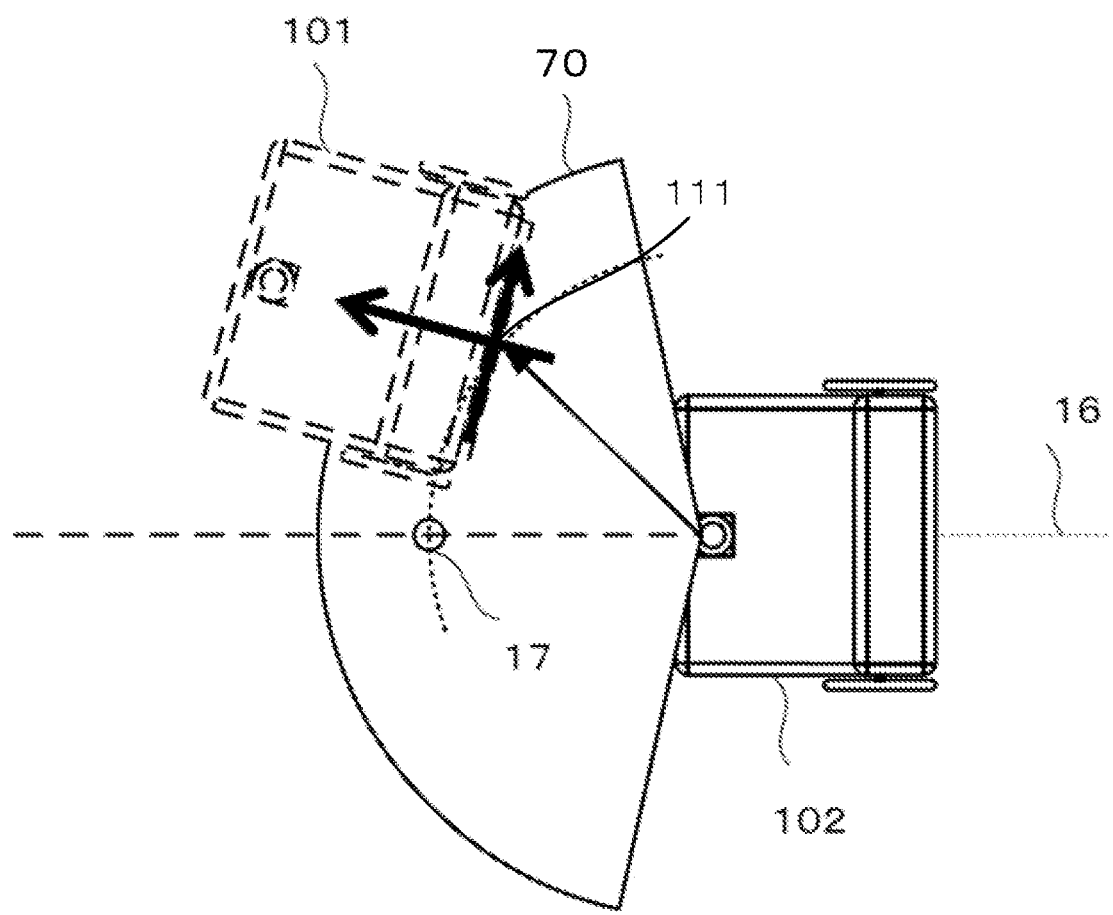
FIG. 21 is a diagram showing an example of setting a point on the travel path of a mobile robot serving as a slave unit at which a mobile robot serving as a master unit is projected, as a local destination.
Figure 22:
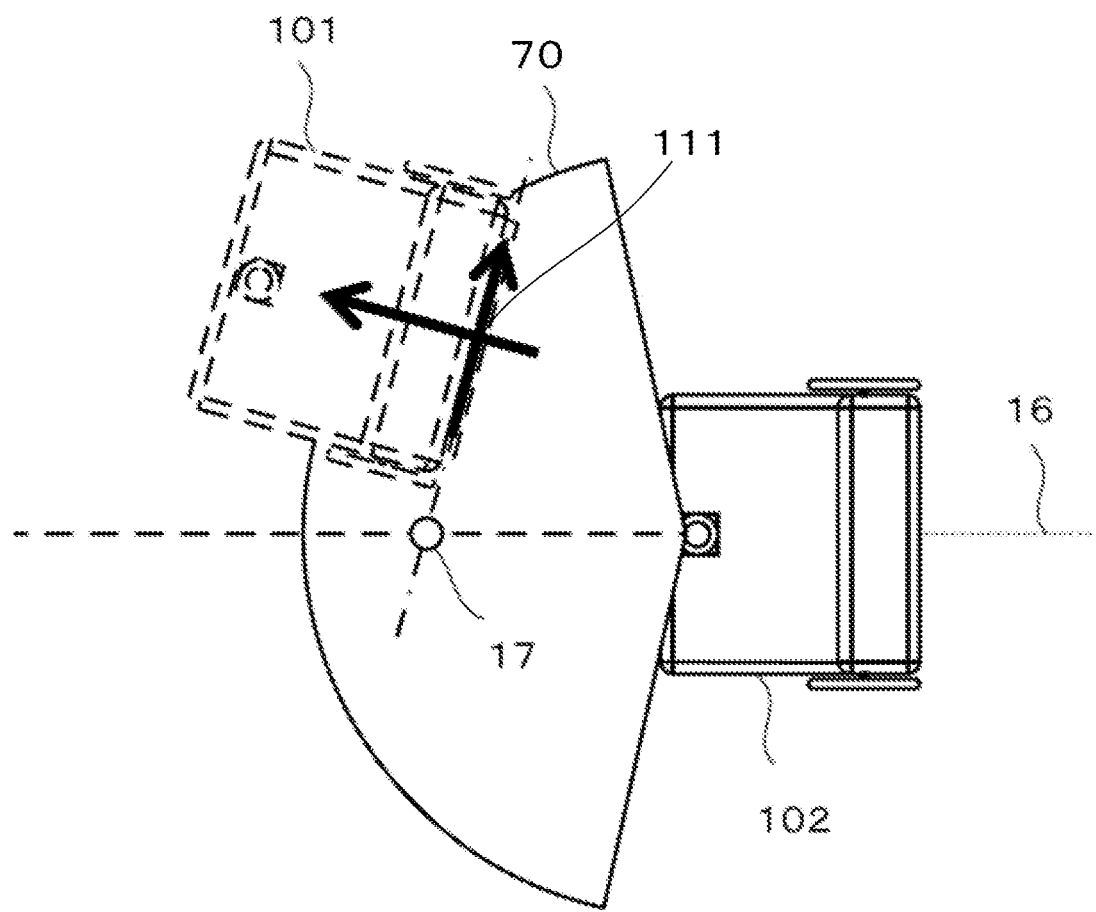
FIG. 22 is a diagram showing another example of setting a point on the travel path of a mobile robot serving as a slave unit at which a mobile robot serving as a master unit is projected, as a local destination.
Figure 23:
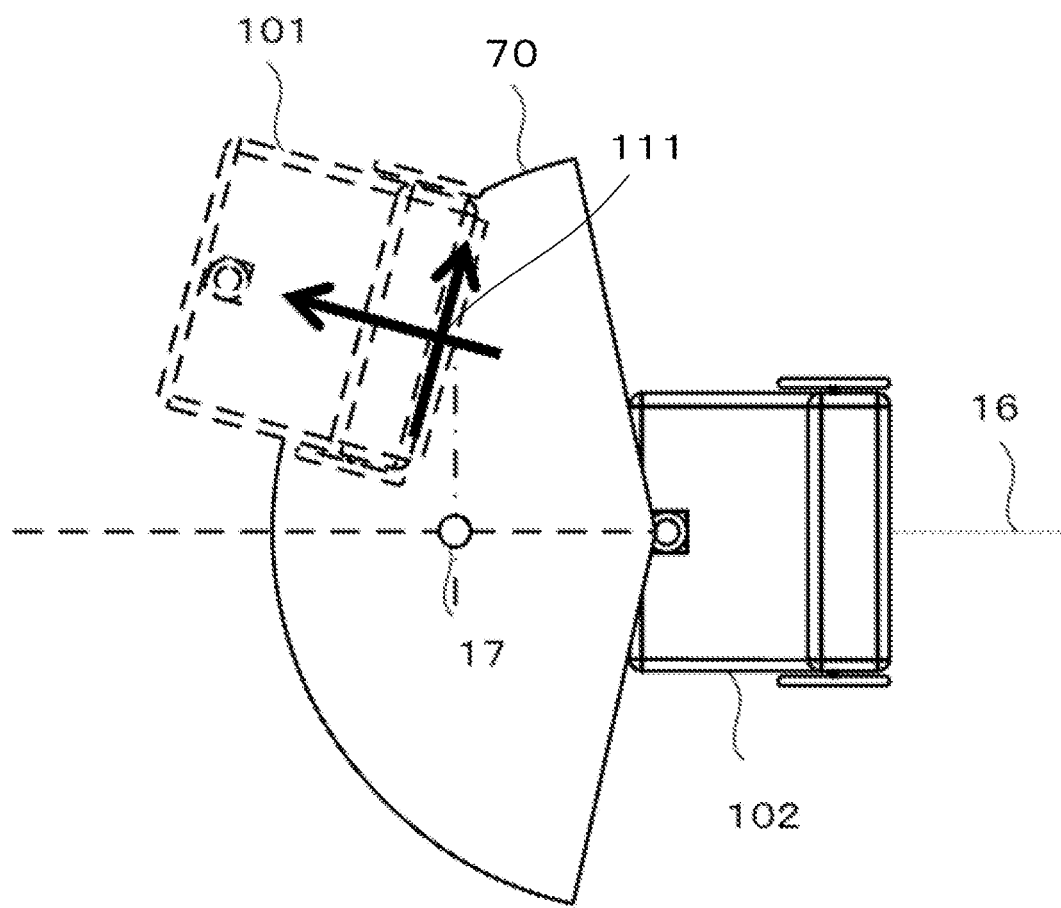
FIG. 23 is a diagram showing still another example of setting a point on the travel path of a mobile robot serving as a slave unit at which a mobile robot serving as a master unit is projected, as a local destination.

FIGS. 21 to 23 are diagrams showing an image in which self-position 111 of mobile robot 101 serving as a master unit is projected at a point on travel path 16 of mobile robot 102 serving as a slave unit, and the point is set as local destination 17 by intelligence processor 10.

As shown in FIG. 21, in Step S34, the distance between self-position 111 of mobile robot 101 serving as a master unit and mobile robot 102 serving as a slave unit, for example, the center of range sensor 4 is calculated, and an arc having the distance as a radius and centered on the center of range sensor 4 is drawn. Subsequently, the intersection point of this arc and travel path 16 of mobile robot 102 serving as a slave unit is set as local destination 17.

The intersection point of travel path 16 and a straight line extending perpendicularly to the travel direction of mobile robot 100 from the position of mobile robot 100 may be set as local destination 17. For example, as shown in FIG. 22, a straight line passing through self-position 111 of mobile robot 101 and extending along the back side of mobile robot 101 as viewed from mobile robot 102 serving as a slave unit is drawn, and the intersection point of that straight line and travel path 16 of mobile robot 102 serving as a slave unit can be determined as local destination 17.

Alternatively, as shown in FIG. 23, a perpendicular may be drawn from self-position 111 of mobile robot 101 to travel path 16 of mobile robot 102 serving as a slave unit, and the intersection point of the perpendicular and that travel path 16 may be set as local destination 17.

As described above, in the local destination calculation processing according to Embodiment 2, the presence or absence of mobile robot 101 within scanning range 70 is determined based on positional information about an object to be detected by range sensor 4 and information about self-positions 111 and 112 shared between mobile robots 101 and 102. Accordingly, as in Embodiment 1, even when obstacle 19 exists on travel path 16 of mobile robot 100, multiple mobile robots 100 can travel along the same track in formation.

The disclosure of the specification, accompanying drawings, and abstract included in Japanese Patent Application No. 2017-152523 filed on Aug. 7, 2017 is incorporated in this application by reference.

INDUSTRIAL APPLICABILITY

The present invention is widely applicable to the field of autonomous mobile robot or automatic driving.

REFERENCE SIGNS LIST

1 Driving wheel
2 Sub wheel
3 Mobile robot main body
4 Range sensor
5 Controller
6 Map storage
7 Destination setting processor
8 Sensor data acquisition processor
9 Self-position estimation processor
10 Intelligence processor
11 Driving wheel controller
12 Recognition marker
15 Destination
16 Travel path
17 Local destination
18 Shortest path
19 Obstacle
20 Mobile robot to be followed
21 Communication processor
40 Range sensor
50 Following mobile robot
70 Scanning range
100 Mobile robot
101 Mobile robot (master unit) traveling in formation
102 Mobile robot (slave unit) traveling in formation
111 Self-position
112 Self-position

What is claimed is:

1. A mobile body, comprising:
a map storage that stores travel path information; and
an intelligence processor that recognizes whether or not an object in a periphery is a mobile body to be followed, wherein
when the object is the mobile body to be followed and the mobile body to be followed does not exist on a travel path indicated by the travel path information, the intelligence processor sets a position on the travel path in which the mobile body to be followed is projected, as a temporary destination,
wherein the intelligence processor sets an intersection point of the travel path and an arc having a radius equal to a distance between a predetermined position of the mobile body and the mobile body to be followed and being centered on the predetermined position, as the temporary destination.

2. The mobile body according to claim 1, wherein
when the object is an obstacle and the obstacle exists on the travel path indicated by the travel path information, the intelligence processor sets an intersection point of the obstacle and the travel path, as the temporary destination.

3. The mobile body according to claim 1, wherein
when the object is an obstacle and the obstacle does not exist on the travel path indicated by the travel path information, the intelligence processor determines to execute an operation for going around the obstacle.

4. The mobile body according to claim 1, further comprising a sensor that detects the object.

5. The mobile body according to claim 4, wherein
the sensor detects a recognition marker provided on a back side of the mobile body to be followed, and
the intelligence processor recognizes the mobile body to be followed, based on the recognition marker detected by the sensor.

6. The mobile body according to claim 4, wherein
the sensor detects a shape of the object, and
the intelligence processor recognizes the mobile body to be followed, based on the shape of the object detected by the sensor.

7. The mobile body according to claim 1, further comprising a communication processor that receives information about a self-position of the mobile body to be followed, wherein
the intelligence processor recognizes the mobile body to be followed, based on the information about the self-position received by the communication processor.

8. A method of controlling a mobile body, comprising:
recognizing whether or not an object in a periphery is the mobile body to be followed;
setting, when the object is the mobile body to be followed and the mobile body to be followed does not exist on a travel path indicated by travel path information, a position on the travel path in which the mobile body to be followed is projected, as a temporary destination; and
controlling the mobile body to move towards the temporary destination,
wherein an intersection point of the travel path and an arc having a radius equal to a distance between a predetermined position of the mobile body and the mobile body to be followed and being centered on the predetermined position, is set as the temporary destination.

* * * * *